(12) United States Patent
Datta et al.

(10) Patent No.: US 12,339,982 B2
(45) Date of Patent: Jun. 24, 2025

(54) CENTRALIZED MASTER DATA MANAGEMENT SYSTEM AND METHOD

(71) Applicant: RAKUTEN SYMPHONY, INC., Tokyo (JP)

(72) Inventors: Anindita Datta, Tokyo (JP); Hitomi Waki, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/755,544

(22) PCT Filed: Apr. 1, 2022

(86) PCT No.: PCT/US2022/022983
§ 371 (c)(1),
(2) Date: May 2, 2022

(87) PCT Pub. No.: WO2023/191804
PCT Pub. Date: Oct. 5, 2023

(65) Prior Publication Data
US 2024/0303356 A1  Sep. 12, 2024

(51) Int. Cl.
*G06F 21/62* (2013.01)
*G06F 9/451* (2018.01)

(52) U.S. Cl.
CPC .......... *G06F 21/6218* (2013.01); *G06F 9/451* (2018.02)

(58) Field of Classification Search
None
See application file for complete search history.

(56) References Cited

U.S. PATENT DOCUMENTS

| 2012/0215668 A1* | 8/2012 | Krakowiecki | G06Q 40/12 705/30 |
| 2018/0144021 A1* | 5/2018 | Drinfeld | G06F 21/6218 |

* cited by examiner

*Primary Examiner* — Brandon Hoffman
(74) *Attorney, Agent, or Firm* — HAUPTMAN HAM, LLP

(57) ABSTRACT

A centralized master data management system (CMDMS) includes a memory having instructions; and processing circuitry coupled to the memory, and being configured to execute the instructions, causing the processing circuitry to cause a graphical user interface (GUI) to be output by a user interface (UI), the GUI includes a first user input field configured to receive a first user input identifying an administrator to log in to the CMDMS; in response to a successful log in to the CMDMS, obtain master data from the memory, the master data being associated with the administrator; update the GUI to include a list of region configuration profiles (RCPs) managed by the administrator; and one or more functional elements, wherein each functional element trigger a respective action in response to being selected by the administrator; and authorize a user, within a predefined region, to be able to create and submit budget applications.

20 Claims, 14 Drawing Sheets

CENTRALIZED MASTER DATA MANAGEMENT SYSTEM AND METHOD

RELATED APPLICATIONS

The present application is a National Phase of International Application No. PCT/US2022/022983, filed Apr. 1, 2022.

BACKGROUND

A budget is a financial plan for a defined period. A budget includes planned sales volumes and revenues, resource quantities, costs and expenses, assets, liabilities, and cash flows. Companies, governments, families, and other organizations use a budget to express strategic plans of activities or events in measurable terms. A budget is the sum of finances allocated for a particular purpose and the summary of intended expenditures along with proposals for how to meet the intended expenditures. A budget surplus includes excess income over expenses, a budget deficit includes excess expenses over income, or a balanced budget where the expenses are substantially equal to the income.

BRIEF DESCRIPTION OF THE DRAWINGS

Aspects of the present disclosure are best understood from the following detailed description read with the accompanying figures. In accordance with the standard practice in the industry, various features are not drawn to scale. The dimensions of the various features are arbitrarily increased or reduced for clarity of discussion.

DETAILED DESCRIPTION

Figure 1:
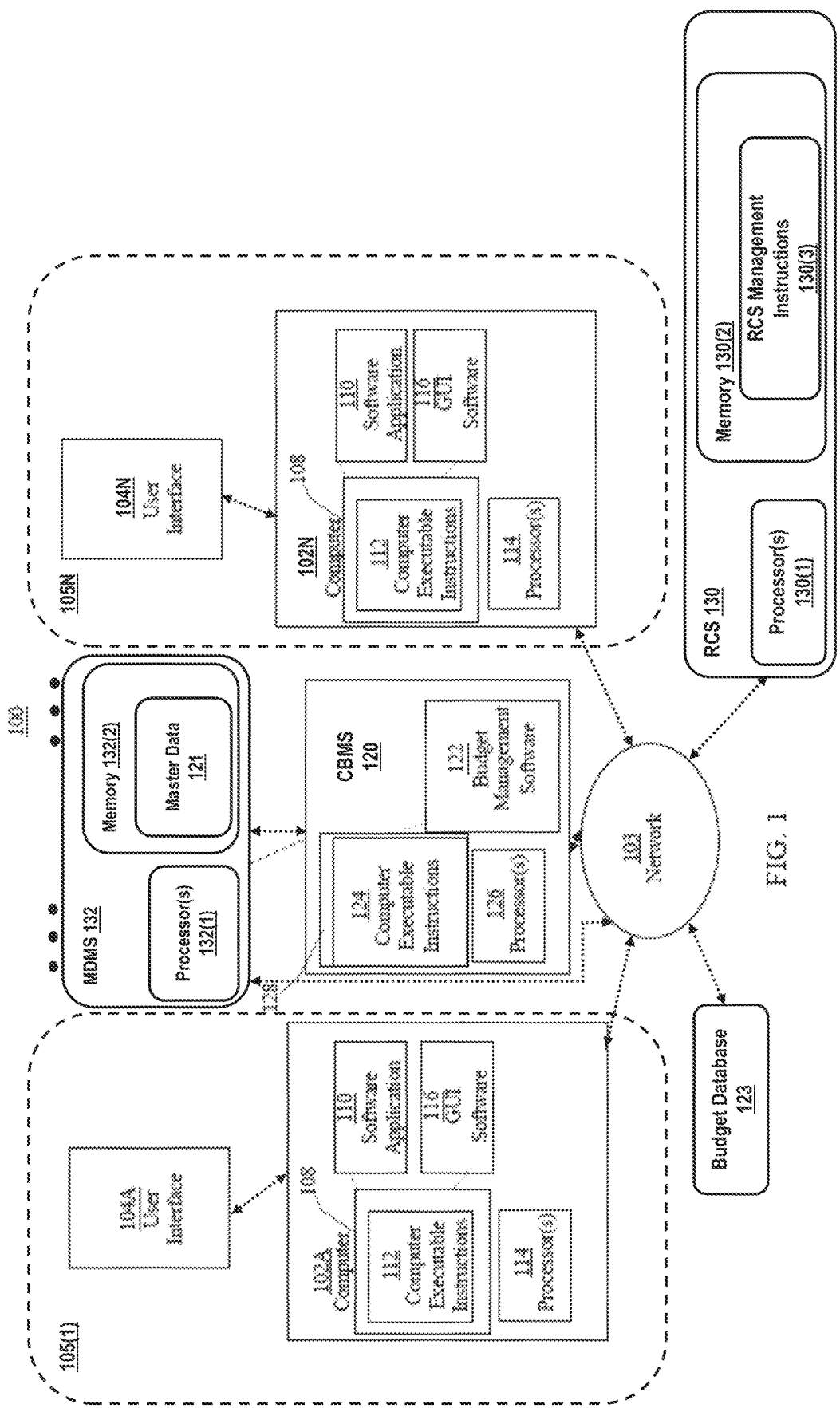
FIG. 1 is a block diagram of a centralized master data management system (CMDMS), in accordance with some embodiments.

The following disclosure provides different embodiments, or examples, for implementing features of the provided subject matter. Specific examples of components, materials, values, steps, arrangements, or the like, are described below to simplify the present disclosure. These are, of course, examples and are not limiting. Other components, materials, values, steps, arrangements, or the like, are contemplated. For example, the formation of a first feature over or on a second feature in the description that follows includes embodiments in which the first and second features are formed in direct contact and includes embodiments in which additional features are formed between the first and second features, such that the first and second features are unable to be in direct contact. In addition, the present disclosure repeats reference numerals and/or letters in the various examples. This repetition is for the purpose of simplicity and clarity and does not dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a centralized master data management system (CMDMS) is disclosed. In some embodiments, the CMDMS is configured to allow multiple users of different backgrounds (e.g., different regions, different departments, different teams, or other suitable user variances within the contemplated scope of the disclosure) to manage master data of a user (e.g., master data configured to be used in a budget application process), such as each subordinate authorized to create a budget for a person in charge (PIC). In some embodiments, the CMDMS is configured to use the master data to verify the viability of a budget application created by a user before the budget application is submitted.

Many organizations have branch offices or subsidiary companies in different regions. Under such conditions, each of the companies or offices in different regions have separate financial departments and separate budget managing systems. However, these other approaches create discrepancies and variances within the budget application process (e.g., different formats, and other suitable intricacies within the contemplated scope of the disclosure) and these discrepancies are amalgamated into an overall budget (e.g., creating an annual financial report which includes all budgets from all offices/companies and other suitable budgetary components within the contemplated scope of the disclosure). Further, in response to users from different regions being unable to access budgetary information of other regions, issues are created (e.g., as one region of a company has no idea what another region of the company is doing).

Additionally, in response to a user being unfamiliar with a certain type of budget application designated for use (e.g., the user is a new employee, the user transferred from other group or company, or other suitable problem within the contemplated scope of the disclosure), problems are created. Thus, in response to a user submitting an application that is not designated for the user, confusion and issues are created that waste a reviewer's time as well as the applicant's time in revision and resubmission of the application.

In some embodiments, the CMDMS is accessible by multiple users of different backgrounds (e.g., to provide a standardized budget application format, or other suitable uniformity within the contemplated scope of the disclosure), while ensuring that the users are restricted from sensitive information.

In some embodiments, the CMDMS determines whether a budget application created by a user is viable before the budget application is submitted for approval. In some embodiments, the CMDMS provides a regional configuration system (RCS) and a master data management system (MDMS) to support a centralized budget management system (CBMS).

In some embodiments, a super admin accesses the RCS to create multiple regional configuration profiles (RCPs). A super admin is a database administrator that uses software to store and organize data. In some embodiments, the super admin role includes capacity planning, installation, configuration, database design, migration, performance monitoring, security, troubleshooting, as well as backup and data recovery. In some embodiments, the super admin assigns a region to each of the users by adding/mapping the users to a respective RCP. In some embodiments, the users are able to access the CMDMS, but are restricted from regions other than the region specified by an assigned RCP.

In some embodiments, after the super admin assigns a region to one or more users, budget administration accesses the CMDMS to manage the master data associated with each user located in the user's respective region (e.g., add/edit/delete, or other suitable administration procedures within the contemplated scope of the disclosure). In some embodiments, in response to a user c accessing the CBMS, the CMDMS retrieves the user's master data (e.g., in response to the user's first log-in to the CMDMS). In some embodiments, in response to the user selecting/inputting budgetary parameters for a budget application, the CBMS compares the selected/inputted budgetary parameters with the master data retrieved by the CMDMS, to determine whether the budget application viable for the user and the organization.

In some embodiments, the CMDMS is configured to manage master data of different users from different backgrounds (e.g., different regions, different departments, different teams, and other suitable differentiators within the contemplated scope of the disclosure) through a master data management system (MDMS), thereby avoiding discrepancy in data and simplifying the master data management. The MDMS is a subsystem of the CMDMS responsible for storing, managing, collecting, and distributing master data of different users of different regions, different departments, different teams, and other suitable identifier within embodiments of the present disclosure.

In some embodiments, the CMDMS allows multiple users to access the MDMS to manage the master data while controlling the privileges (e.g., the super admin has the highest privilege and manages the master data, a budget admin has access to an assigned/mapped region, and other users view, and export created master data but are unable to add/edit/delete master data) of the users based on the user's persona. A persona is a role (e.g., admin, read-only, and other suitable identifier within embodiments of the present disclosure) of a user in the system.

In some embodiments, the CMDMS provides system flexibility (e.g., a common system with multiple users with different personas and the user continues to use the same system even though advancement in responsibility causes a persona to change) while ensuring the information security. In some embodiments, the CBMS is configured to allow users to create master data in different manners (e.g., through manually input of master data information through a user interface (UI), or through uploading a document that contains master data information). In some embodiments, such features are configured to allow users with different backgrounds (e.g., inexperienced budget admin, experienced budget admin, and other suitable personnel within the contemplated scope of the disclosure) to build the master data in a preferred manner, while ensuring the standardization of the master data.

In some embodiments, the CMDMS compares the inputted budgetary parameters (e.g., potential master data) of the users (e.g., in response to creating budget application through CBMS) with an allowed budget application (e.g., defined by information within the master data), to reduce the rate of incorrect budget applications and reduce the labor-intensive process of reviewing incorrect budget applications and shorten the overall budget application turnaround time.

In some embodiments, the CBMS is communicatively connected to the RCS and to the MDMS. In some embodiments, the CBMS is communicatively connected to a user terminal (e.g., budget requestor, budget reviewer, or other suitable user within the contemplated scope of the disclosure). In some embodiments, a terminal is an electronic or electromechanical hardware device used for entering data into, and transcribing data from, a computer or a computing system. In some embodiments, through the present disclosure a user interface is used interchangeably with terminal. In some embodiments, the RCS is communicatively connected to a terminal of the super admin. In some embodiments, the RCS and CBMS are communicatively connected to the terminal of the super admin, a terminal of a budget admin, and the MDMS.

In some embodiments, the CBMS, the RCS, and MDMS are deployed on one or more cloud servers. In some embodiments, a determination is made as to whether master data of a user exists before a user (e.g., applicant or reviewer) is able to access to the CMDMS. In some embodiments, initial master data is created by the super admin and all master data afterwards is managed by the super admin and/or the budget admin. In some embodiments, the budget admin is added to an RCP by the super admin to assign the budget admin to a region before master data is created. In some embodiments, once a region is assigned to the budget admin, the budget admin is able to create master data associated to the assigned region.

In some embodiments, a process for creation of an RCP includes a super admin logging into to the RCS through a terminal, such as a user interface (UI). In some embodiments, the RCS generates and presents a graphical user interface (GUI) to the super admin through the UI. In some embodiments, the GUI includes a list of RCPs created/managed by the super admin, a plurality of functional elements (e.g., a button, a drop-down list, and other suitable human interface devices within the contemplated scope of the disclosure) each of which trigger a respective action in response to being selected/activated by the super admin.

In some embodiments, the super admin is able to edit the RCPs (e.g., add/remove budget admin into the region, change name of region, and other suitable modifications within the contemplated scope of the disclosure) presented on the list of RCPs. In some embodiments, the super admin is able to delete RCPs. In a non-limiting example, the super admin is able to add a new RCP and then add a budget admin for the new RCP.

In some embodiments, the RCS receives the super admin's input, generates, and presents through the GUI, a pop-out window to the super admin. In some embodiments, the pop-out window includes a plurality of user input fields each of which allows the super admin to input or select parameters for specifying a new RCP. In some embodiments, after a new RCP is created, the RCS generates a new list of RCPs and replaces the previous list of RCPs with the new list of RCPs on the GUI, such that the newly created RCP is included and shown in the list.

In some embodiments, the super admin adds (e.g., maps) one or more users to a newly created RCP. In some embodiments, the super admin triggers an add user functional element (e.g., a + button, or other suitable human interface devices within the contemplated scope of the disclosure) and generates and presents through the GUI a pop-out window to the super admin and the RCS receives collected information of available users from the MDMS (which is external to or internal to a regional system). In some embodiments, the pop-out window includes a list of available users and a plurality of user input fields each of which allow the super admin to input or select a parameter (e.g., name of user, select/deselect a user, or other suitable parameters within the contemplated scope of the disclosure).

In some embodiments, after adding one or more users to the newly created RCP, the added user now has access to master data associated with a region specified by the RCP and set by the super admin. In a non-limiting example, once the budget admin is assigned with a respective region by the super admin, the budget admin is able to create and manage master data for users that belong to the assigned region. In some embodiments, the process of region configuration creation and mapping is performed once in response to a new budget admin. In some embodiments, in response to a budget admin moving from one region to another region, the super admin is able to edit the assigned RCP to update the respective move. In some embodiments, in response to a budget admin moving to another role, the super admin is able to delete the assigned budget admin no longer has privileges of a budget admin for the RCP.

In some embodiments, a budget admin logs into to the CMDMS by inputting user information to a GUI presented by a UI. In some embodiments, the CMDMS verifies that the inputted log in information complies with the budget admin parameters. In some embodiments, the CMDMS generates and presents a GUI to the budget admin configured to allow the budget admin to freely create and manage (e.g., edit, delete, and other suitable modifications within the embodiments of the disclosure) master data stored in the MDMS within the budget managers assigned RCP. In some embodiments, in response to the CMDMS verifying that the user is an authorized user but not having a budget admin role, the CMDMS generates and presents another GUI to the user, so that the user is able to view, search and/or export the created master data but not be able to create new master data or manage the created master data.

In some embodiments, a list of master data available to be managed is provided to the budget admin through a GUI. In some embodiments, master data within the list of master data available is able to be managed (e.g., edit, delete, and other suitable data modifications within embodiments of the disclosure) by selecting the master data (e.g., by clicking on the respective master data, by shortcut key, or other suitable human interface device within the contemplated scope of the disclosure) and the CMDMS retrieves the information associated with the selected master data from the MDMS. In some embodiments, CMDMS generates a new GUI (e.g., on-top of the already presented GUI), presenting to the budget admin user input fields that contain the information of the selected master data, where the budget admin is able to edit the information directly on the user input fields. In a non-limiting example, the budget admin receives information regarding a new user from the super admin and creates master data for the new user based on information provided by the user through the CBMS.

In some embodiments, a GUI provides options for the budget admin to create new master data. In some embodiments, the master data is added by directly inputting the user's information through user input fields of the GUI or by uploading a document (e.g., excel, csv, or other suitable document within the contemplated scope of the disclosure) containing the user's information. In some embodiments, the master data is stored in the MDMS after the master data of the user is created. In some embodiments, in response to a user creating a budget application through the CBMS, the CMDMS accesses the MDMS and retrieves the master data associated with the user. In some embodiments, the master data is in a suitable data format, e.g., excel, csv, and other suitable file formats within the contemplated scope of the disclosure. In some embodiments, the master data comprises information of different fields, such as: user's department, budget type available to the user, project type available to the user, and other suitable information within the contemplated scope of the disclosure.

In some embodiments, based on the master data of the user, the CMDMS generates and presents a GUI which contains features available to the user. In a non-limiting example, in response to the master data determining a user is in region A, department A, working on project A and is able to create a budget application, and the user is attempting to apply for a budget or to apply a budget for location B, then the CMDMS detects the discrepancy between the desired budget application and the locations (e.g., based on the master data). In some embodiments, the CMDMS generates and presents an error message to the user through the GUI. In some embodiments, the CMDMS generates a guidance message based on the master data and presents the guidance message to the user through the GUI, such that the user is informed of what kind of budget application is allowed to be created (e.g., CMDMS has detected your budget is for location B, perhaps you mean to apply the budget to location A).

FIG. 1 is a block diagram of a centralized master data management system (CMDMS) 100, in accordance with some embodiments.

CMDMS 100 includes computers 102A through 102N (where N is a positive non-zero number and computers 102A through 102N are referred to generically or collectively as computers 102) that are operably connected to user interfaces (UIs) 104A through 104N ((where N is a positive non-zero number and UIs 104A through 104N are referred to generically or collectively as UI 104). Computers 102 are connected to a centralized budget management system (CBMS) 120, a regional configuration system (RCS) 130, and a master data management system (MDMS) 132 through a network 103. Computers 102 are configured to manage the regionalization (through RCS 130), creation and editing of master data 121 (through MDMS 120), for each CMDMS user, and to communicate with MDMS 132 configured to store and retrieve master data 121.

Computers 102 are digital electronic machines that are programmed to carry out sequences of arithmetic or logical operations (computation). Computers 102 perform generic sets of operations known as programs that enable computers 102 to perform a wide range of tasks. In some embodiments, computers 102 are computer systems that include the hardware, operating system (main software), and peripheral equipment. In some embodiments, computers 102 further refer to a group of computers that are linked and function together, such as a computer network or computer cluster.

Computer 102A is included within region 105(1) and computer 102N is included within region 105N. In some embodiments, regions 105(1) and 105N are in separate buildings. In some embodiments, regions 105(1) and 105N are in separate cities. In some embodiments, regions 105(1) and 105N are in separate states. In some embodiments, regions 105(1) and 105N are in separate countries. In some embodiments, regions 105(1) and 105N are in separate divisions within the same company. In some embodiments, regions 105(1) and 105N are in separate subsidiaries of the same company. In some embodiments, regions 105(1) and 105N are in separate companies of the same conglomerate.

Computers 102, CBMS 120, RCS 130, and MDMS 132 are communicatively connected to network 103 (e.g., through one or more wireless network interfaces such as BLUETOOTH, WIFI, WIMAX, GPRS, or WCDMA, one or more wired network interfaces such as ETHERNET, USB, or IEEE-884, or a combination thereof). In some embodiments, CBMS 120 is in region 105(1). In some embodiments, CBMS is in region 105N. In some embodiments, CBMS 120 is a region other than 105(1) and 105N.

Computers 102 are communicatively connected (e.g., through a device interface) to respective UI 104 (e.g., terminal). In some embodiments, several computers, hundreds of computers, or thousands of computers are present in CMDMS 100. A UI is one or more input/output (I/O) devices capable of: displaying information communicated from processing circuitry, such as processors 114, to one or more users (e.g., through a GUI, and other suitable display methodologies within the contemplated scope of the disclosure), receiving input (e.g., by using a keyboard, a mouse, and/or other suitable means for receiving input in conjunction with a GUI, and other suitable peripheral device configured to put information into and get information out of a computer within the contemplated scope of the disclosure), and communicating the input to the processing circuitry (e.g., over one or more networks, and other suitable modes used to exchange messages between nodes within the contemplated scope of the disclosure). In various embodiments, UI 104 includes one or more I/O devices located at a single region or distributed over multiple regions (e.g., throughout a global organization, or different locations within a same region, and other suitable structures within the contemplated scope of the disclosure). In some embodiments, the UI is operably responsive to GUI software 116 discussed below. In some embodiments, one or more computers, such as computers 102, are set aside for super admins. In some embodiments, one or more computers, such as computers 102, are set aside for budget admin. In some embodiments, the remaining computers, such as computer 102 are configured for budgetary users and reviewers.

In some embodiments, network 103 includes a wide area network (WAN) (i.e., the internet), a wireless WAN (WWAN) (i.e., a cellular network), a local area network (LAN), a wireless LAN (WLAN), a telecommunication network (e.g., 3G, 4G, LTE, 5G, and other suitable communication platforms are within the contemplated scope of the disclosure), or a combination thereof.

Computer executable instructions 112 are stored on non-transitory computer-readable medium 108 within each of computers 102. In some embodiments, a non-transitory computer readable storage medium (e.g., non-transitory computer-readable medium 108) is an electronic, magnetic, optical, electromagnetic, infrared, and/or a semiconductor read circuit (or apparatus or device). In a non-limiting example, a non-transitory computer readable storage medium includes a semiconductor or solid-state memory, a magnetic tape, a removable computer diskette, a random-access memory (RAM), a read-only memory (ROM), a rigid magnetic disk, and/or an optical disk. In some embodiments using optical disks, a non-transitory computer readable storage medium includes a compact disk-read only memory (CD-ROM), a compact disk-read/write (CD-R/W), and/or a digital video disc (DVD).

In some embodiments, forms of non-transitory computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer reads. The term memory is used herein to refer to a non-transitory computer-readable medium.

Processing circuitry (e.g., one or more processor(s) 114, 126, 130(1), and 132(1)) include a central processing unit (CPU), a multi-processor, a distributed processing read circuit, an application specific integrated circuit (ASIC), a suitable processing unit, a field programmable gate array (FPGA), or a combination thereof. In some embodiments, the processing circuitry corresponds to one or more processors distributed within a cloud computing environment (e.g., over one or more server clusters).

In some embodiments, GUI software 116 supports forms of human-interface devices that allow users to interact with electronic devices through graphical icons and audio indicator such as primary notation, instead of text-based user interfaces, typed command labels or text navigation. The actions in a GUI are usually performed through direct manipulation of graphical elements.

In FIG. 1, CMDMS 100 includes one or more computers 102, RCS 130, MDMS 132, and CBMS 120. In some embodiments, CMDMS 100 includes up to N computers 102, and more than one CBMS 120. In a non-limiting example, a CBMS is available for each region or a CBMS is available for multiple regions (e.g., one CBMS for every set number of regions, or other suitable arrangements within embodiments of the present disclosure). In some embodiments, CBMS 120 is containerized and distributed in a cluster of servers. These and other configurations for CMDMS 100 are within the scope of this disclosure.

CBMS 120 performs budget data management (e.g., creation, modification, deletion, other suitable management functions within the contemplated scope of the disclosure), and MDMS 132 is configured to be used for master data management (e.g., add, delete, configure, or other suitable operations within embodiments of the present disclosure), in addition to storing master data 121. Computer executable instructions 124 are stored on a non-transitory computer readable medium 128.

CBMS 120 is configured to allow multiple users to create and manage a budget (which include varying types of costs). In some embodiments, CBMS 120 allows multiple users to access, create, and manage the user's budget (e.g., department budget, project budget, or other suitable budgets within the contemplated scope of the disclosure) in a systematic (e.g., presented and formulated as a coherent body of budget ideas and principles) and unified manner (e.g., consistent with other project-team PICs and company employees).

Budget management software 122 is configured to manage the creation, editing, and storing of budget data in budget database 123 in MDMS 132 in accordance with method 200 discussed below. In some embodiments, MDMS 132 is a building, a dedicated space within a building, or a group of buildings used to house computer systems and associated components, such as telecommunications and storage systems.

To manage the creation, editing, and storing of budget data 123 in budget database 123 and to perform other functions, computers 102 implement various software applications 110 and GUI software 116. Software applications 110 and GUI software 116 are provided as computer executable instructions 112 that are executable by processing circuitry 114 in each of computers 102. Software applications 110 (application or app for short) are computer programs designed to carry out a task other than one relating to the operation of the computer itself, typically to be used by end-users. Budgeting and accounting software are examples.

Budget data within budget database 123 (e.g., department budget data or project budget data discussed below) are database elements including globally applicable, top-level budget data and itemized budget data corresponding to specific items within a given budget. Non-limiting examples of top-level budget data include department or project names or other identifiers, department or project descriptions, budget types or categories, fiscal years, PIC or other usernames, revision indicators, approval status indicators, total amounts, currency identifiers, cost center or other organizational section identifiers, account level identifiers, and other suitable information within the contemplated scope of the disclosure. Non-limiting examples of itemized budget data include time divisions such as months or quarters, location identifiers, measurement identifiers, item identifiers, item descriptions, unit prices, quantities, rental costs, rental durations, labor rates, labor hours, labor descriptions, outsourcing/contract costs, outsourcing/labor descriptions, team or group identifiers, account level indicators, item amounts, sub-total amounts, currencies, currency exchange rates, and other suitable budget information within the contemplated scope of the disclosure.

The database elements of budget data within budget database 123 are controlled by budget management software 122 through processing circuitry 126 as discussed below to have predetermined structures (e.g., data element size, range of values, and other suitable presentations within the contemplated scope of the disclosure) and relationships (e.g., hierarchies, validation links, and other suitable structures within the contemplated scope of the disclosure) whereby budgets created and maintained using CBMS 120 have standardized formatting and operational workflow.

RCS 130 includes processor(s) 130(1) in communication with memory 130(2) that includes RCS management instructions 130(3). RCS 130 (e.g., a knowledge-based configuration or user configuration) customizes users to meet the needs of a region. RCS 130 and MDMS 132 support CBMS 120. In some embodiments, RCS management instructions 130(3) is configured with artificial intelligence (AI), and it is based on modelling of the configurations in a manner that allows the utilization of AI techniques for searching for a valid configuration to meet the needs of a particular region. RCS 130 is accessible by a super admin to create RCPs and assign a region to each user by adding/mapping the users to a respective RCP. Users are then able to access to CBMS 120, but the user is unable to have access to regions other than the one specified by assigned RCP.

MDMS 132 includes processor(s) 132(1) in communication with memory 132(2) that includes master data 121. MDMS 132 collects data from multiple sources organized for distribution, sharing, and often sub-setting and sharing. In some embodiments, MDMS is a hub and spoke architecture. MDMS is a centralized system to manage master data 121 of different users from different backgrounds. MDMS 132 allows multiple users to access master data 121 while controlling the privilege of the users based on the user's persona. MDMS 132 allows budget admin to create master data 121 in different manners (e.g., via manually inputting information to the UI, or via uploading a document). Such features allow budget admin with different backgrounds to build the master data in a preferred manner, while ensuring the standardization of master data 121. MDMS 132 allows CBMS 120 to compare the parameters inputted by users (when creating budget application) with an allowed budget application (which is defined by master data 121), to reduce the rate of incorrect budget application and reduce the human resources for reviewing incorrect budget application and shorten the overall turnaround time of the budget application.

CMDMS 100 system architecture includes CBMS 120 communicatively connected to RCS 130 and to a MDMS 132. CBMS 120 is communicatively connected to a user interface 104 of a user (e.g., budget requestor, budget reviewer, or other suitable budget personnel within the contemplated scope of the disclosure). RCS 130 is communicatively connected to a user interface, such as any of user interfaces 104, of a super admin. MDMS 132 is communicatively connected to a user interface, such as any of user interfaces 104, of the super admin, a user interface of a budget admin, and master data 121 and/or budget database 123. In some embodiments, CBMS 120 and MDMS 132 are deployed on one or more cloud servers.

In some embodiments, before a user (e.g., requestor or reviewer) accesses CBMS 120, master data 121 of a user is created. In some embodiments, master data 121 is created and managed by a super admin and/or a budget admin. In some embodiments, before master data 121 is created, the super admin adds s budget admin to an RCP so as to assign a region to the budget admin. Subsequently, the budget admin is able to create master data 121 for the assigned region, such as regions 105(1), 105N, and/or any regions between 105(1) through 105N assigned to the budget admin.

Figure 2:
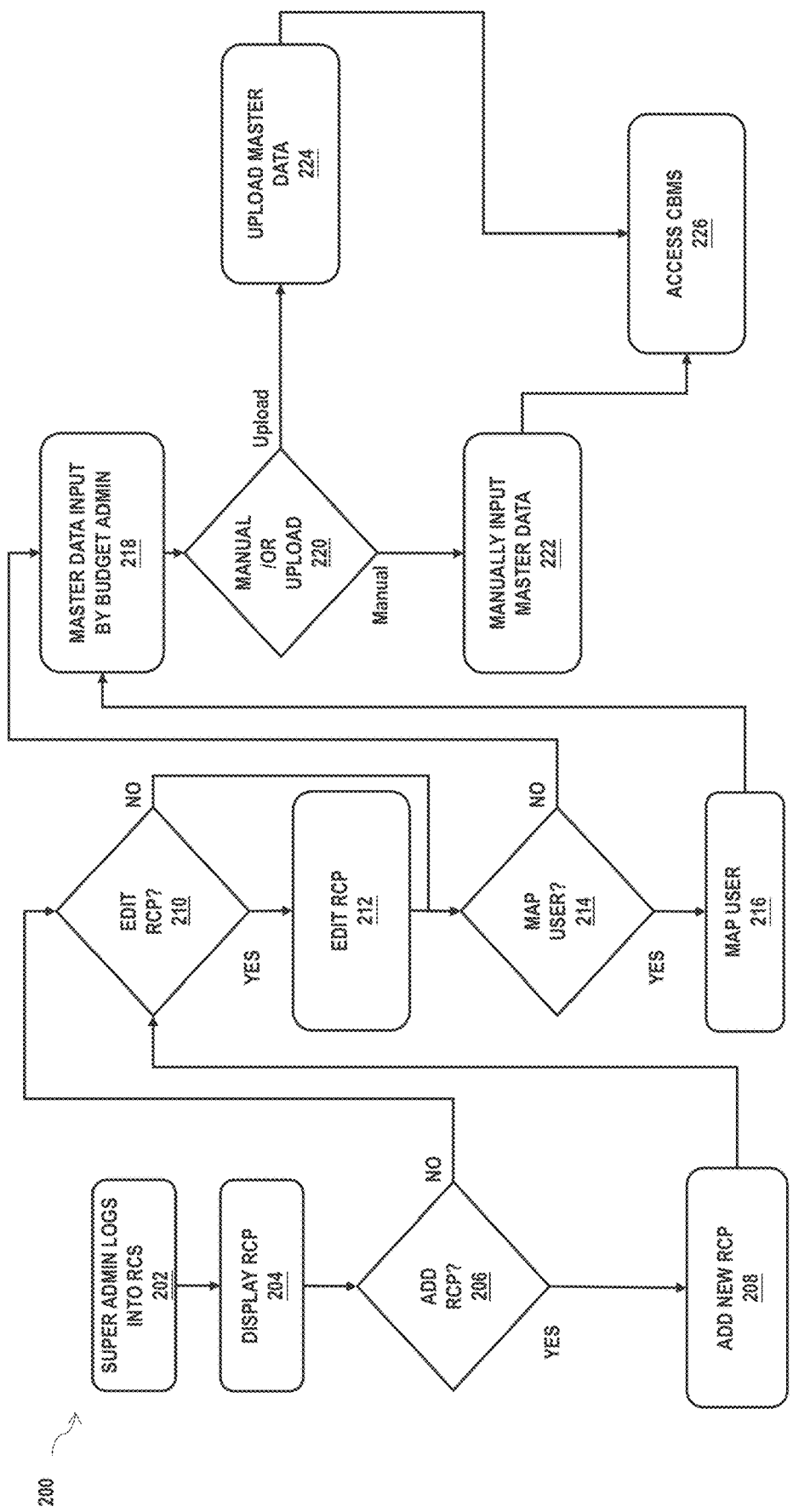
FIG. 2 is a flowchart of a method for budget master data management, in accordance with some embodiments.

FIG. 2 is a flowchart of a method for budget master data management 200, in accordance with some embodiments.

Method 200 is executed by processing circuitry 132(1) discussed above with respect to FIG. 1. In some embodiments, method 200 is a method of managing master data of a centralized budget system from a UI, an uploaded form, an uploaded template, or other suitable user experience within the contemplated scope of the disclosure. In some embodiments, some, or all the operations of method 200 are executed in accordance with instructions corresponding to budget management software 122 discussed above with respect to FIG. 1.

Method 200 includes operations 202-226, but the operations are not necessarily performed in the order shown. Operations are added, replaced, order changed, and/or eliminated as appropriate, in accordance with the spirit and scope of disclosed embodiments. In some embodiments, one or more of the operations of method 200 are repeated. In some embodiments, unless specifically stated otherwise, the operations of method 200 are performed in order.

Method 200 is discussed with reference to FIGS. 2 and 3-14 that display multiple GUI in accordance with some embodiments. The discussion of these GUI embodiments are not exhaustive as other suitable GUIs are within the contemplated scope of the disclosure. Further, the structure of each GUI is generic and one of ordinary skill in the art is able to contemplate other variations. Not all GUIs are necessary to the operation of CMDMS 100 unless specifically stated otherwise. Further, a portion of GUI embodiments are not shown for the sake of brevity and conciseness. However, one of ordinary skill in the art is able to contemplate other GUIs that are able to be added to a systematic and uniform CMDMS, such as CMDMS 100.

Figure 3:
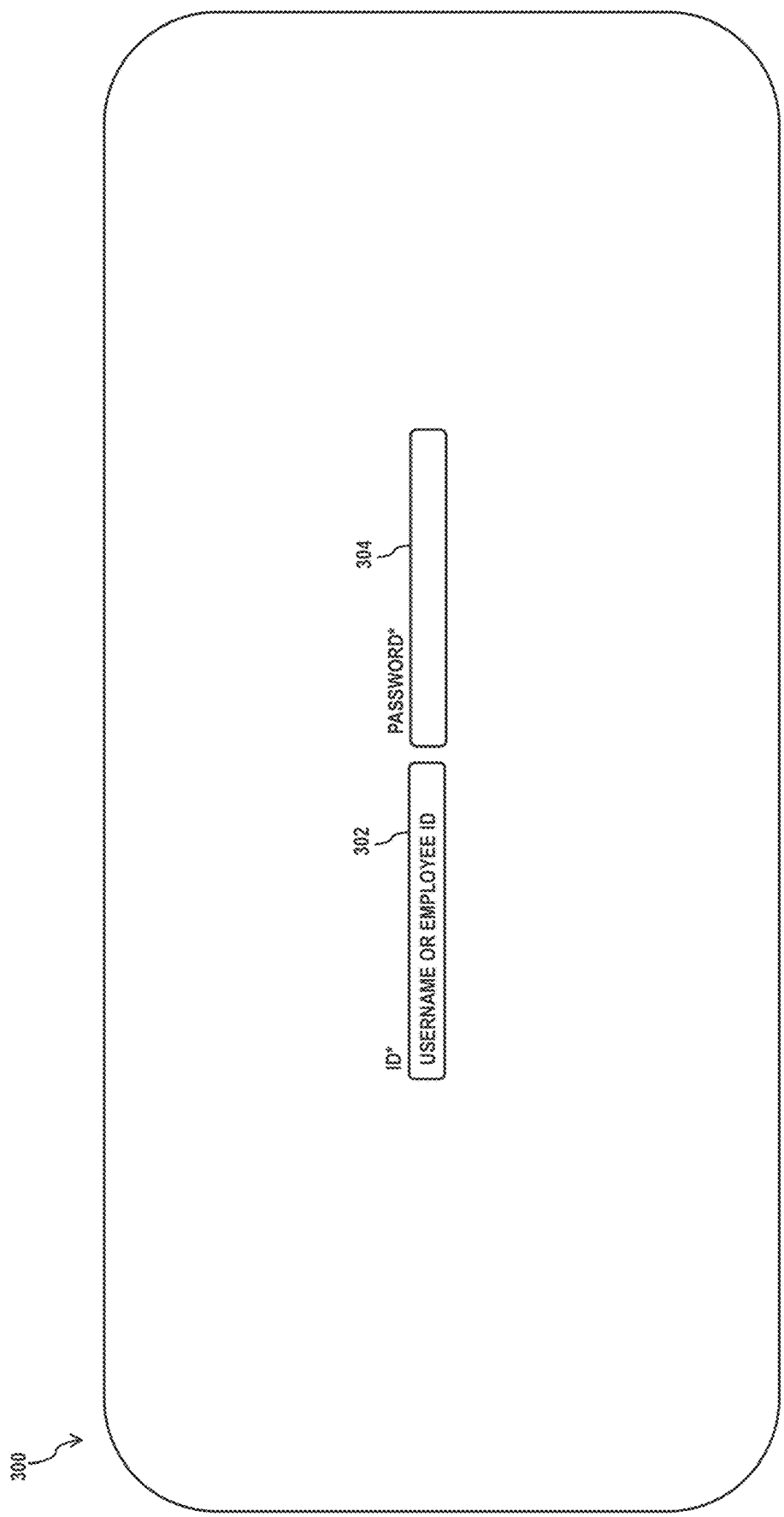
FIG. 3 depicts a graphical user interface (GUI) for a login page, in accordance with some embodiments.

FIG. 3 depicts a graphical user interface (GUI) 300 for a login page, in accordance with some embodiments.

In operation 202 of method 200, a super admin is able to log into RCS 130. In a non-limiting example, at GUI 300 (depicted in FIG. 3) a super admin is presented with user input fields 302 and 304. The super admin is able to input an ID (such as a username, employee ID, or other suitable identification within the contemplated scope of the disclosure) into user input field 302 and a password linked to the user in user input field 304. In response to RCS 130 determining that the input ID and password are accurate, the RCS 130 will grant access to the super admin. Process flows from operation 202 to operation 204.

Figure 4:
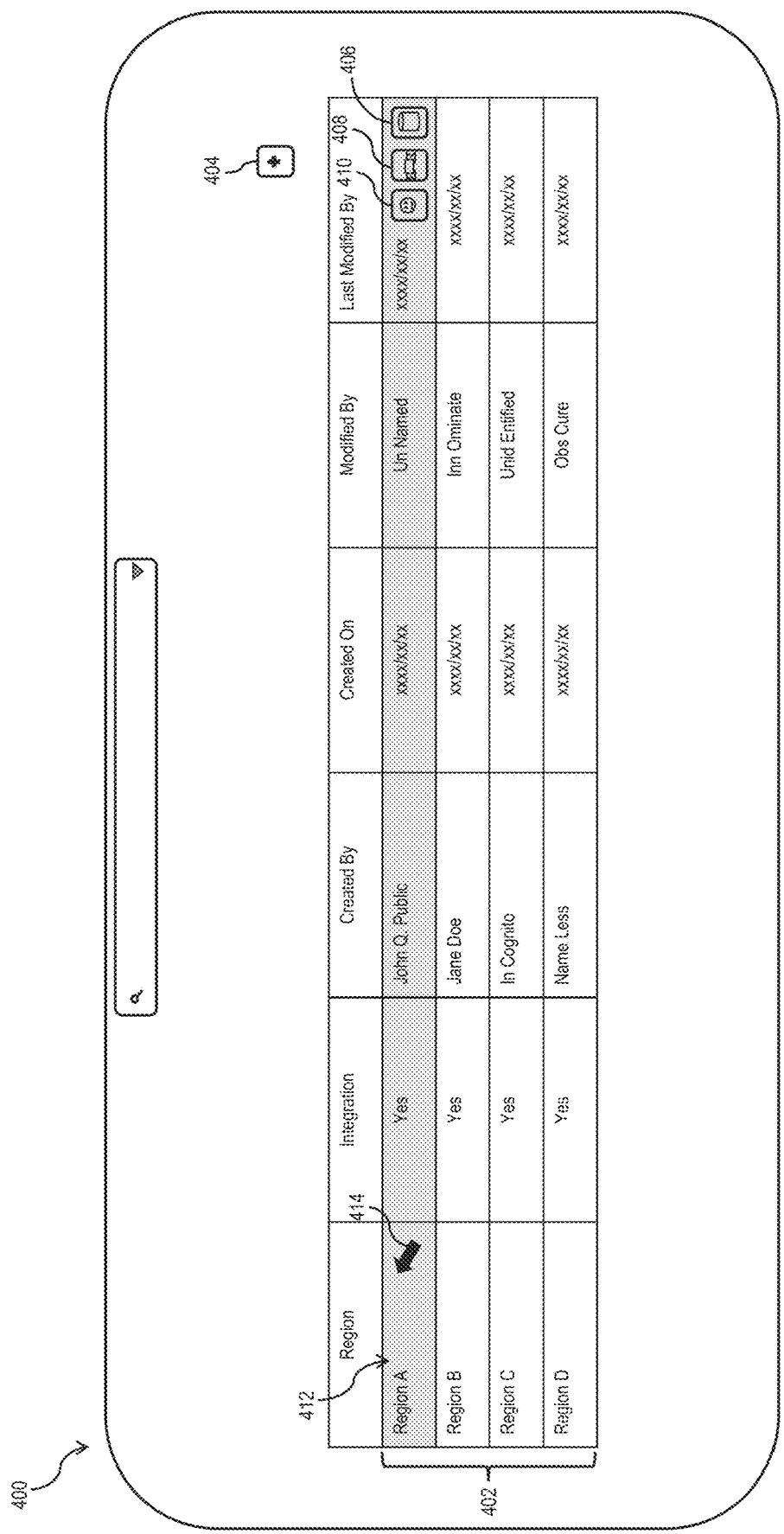
FIG. 4 depicts a region configuration system GUI, in accordance with some embodiments.

FIG. 4 depicts a region configuration system GUI 400, in accordance with some embodiments.

In operation 204, GUI 400 includes a list of RCPs 402 created and managed by the super admin. A super admin accesses RCS 130 through GUI 400 to create one or more RCPs 402, such as list of RCPs 402, and then assign a region to each of the users and budget admin by adding/mapping the users and budget admin to a respective RCP, such as RCP 412. In a non-limiting example, the super admin is able to select an RCP, such as RCP 412, by hovering over RCP 412 with mouse icon 414 and then click on RCP 412 to edit, delete, or map a user or budget admin to RCP 412.

GUI 400 includes functional elements, such as an add-region button 404, a delete-region button 406, an edit-region button 408, and a map-user-account button 410 each of which trigger a respective action in response to being selected/activated by the super admin. In some embodiments, GUI 400 includes additional functional elements (not shown), such as an add time-zone button and any other suitable buttons which allow the super admin to perform appropriate actions within his assigned privileges. Continuing with the non-limiting example above, the super admin is able to delete RCP 412 using delete region button 406, edit RCP 412 with edit-region button 408, and add or map a user or budget admin to RCP 412 with map-user-account button 410. The super admin is able to edit each of the RCPs (e.g., add/remove budget admin into the region with map-user-account button 410, change name of region with edit-region button 408, or delete the region entirely with delete-region button 406) presented in list of RCPs 402. Process flows from operation 204 to operation 206.

Figure 5:
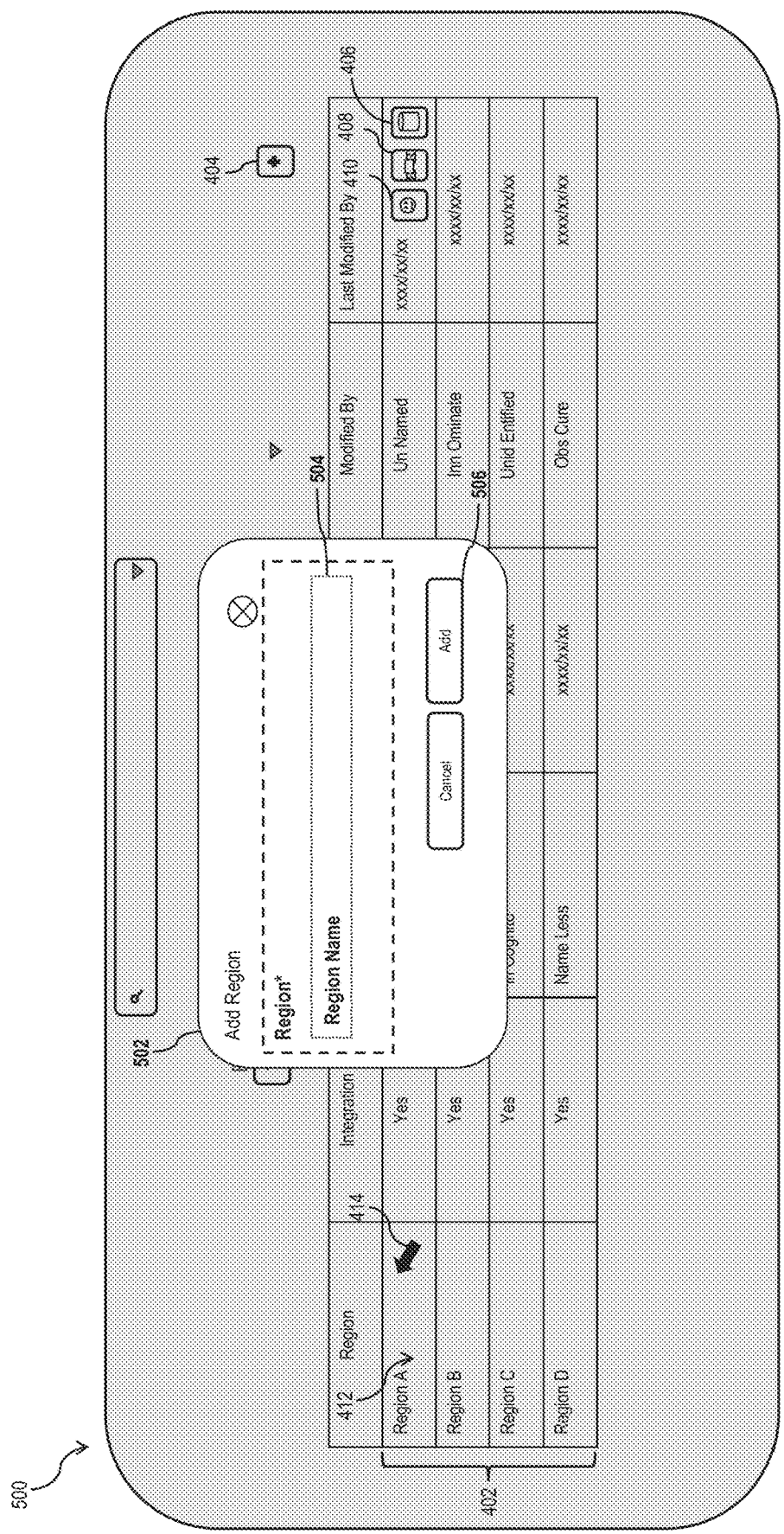
FIG. 5 depicts a region configuration system GUI, in accordance with some embodiments.

FIG. 5 depicts a region configuration system GUI 500, in accordance with some embodiments.

In operation 206 of method 200, the super admin is able to add a new RCP by clicking on add-region button 404 ("YES" branch of block 206). GUI 500 displays pop-out window 502 that is configured to allow the super admin to add a region by inserting a region name in box 504 and clicking on add button 506. Process flows from operation 206 to operation 208.

In operation 208 of method 200, once add button 506 is clicked another pop-out window (not shown) includes a plurality of user input fields each of which allows the super admin to input or select parameters for specifying the new RCP. In a non-limiting example, in response to a user providing input to the super admin, the super admin is able to trigger an associated functional element on the pop-out window. RCS 130 receives the user's input, generates, and presents the user's input through the GUI pop-out window to the super admin. The pop-out window includes one or more user input fields, each of which is configured to allow the super admin to input or select parameters for specifying the new RCP.

In response to the super admin selecting not to add a new RCP ("NO" branch of block 206), process flows from operation 206 to operation 210.

Figure 6:
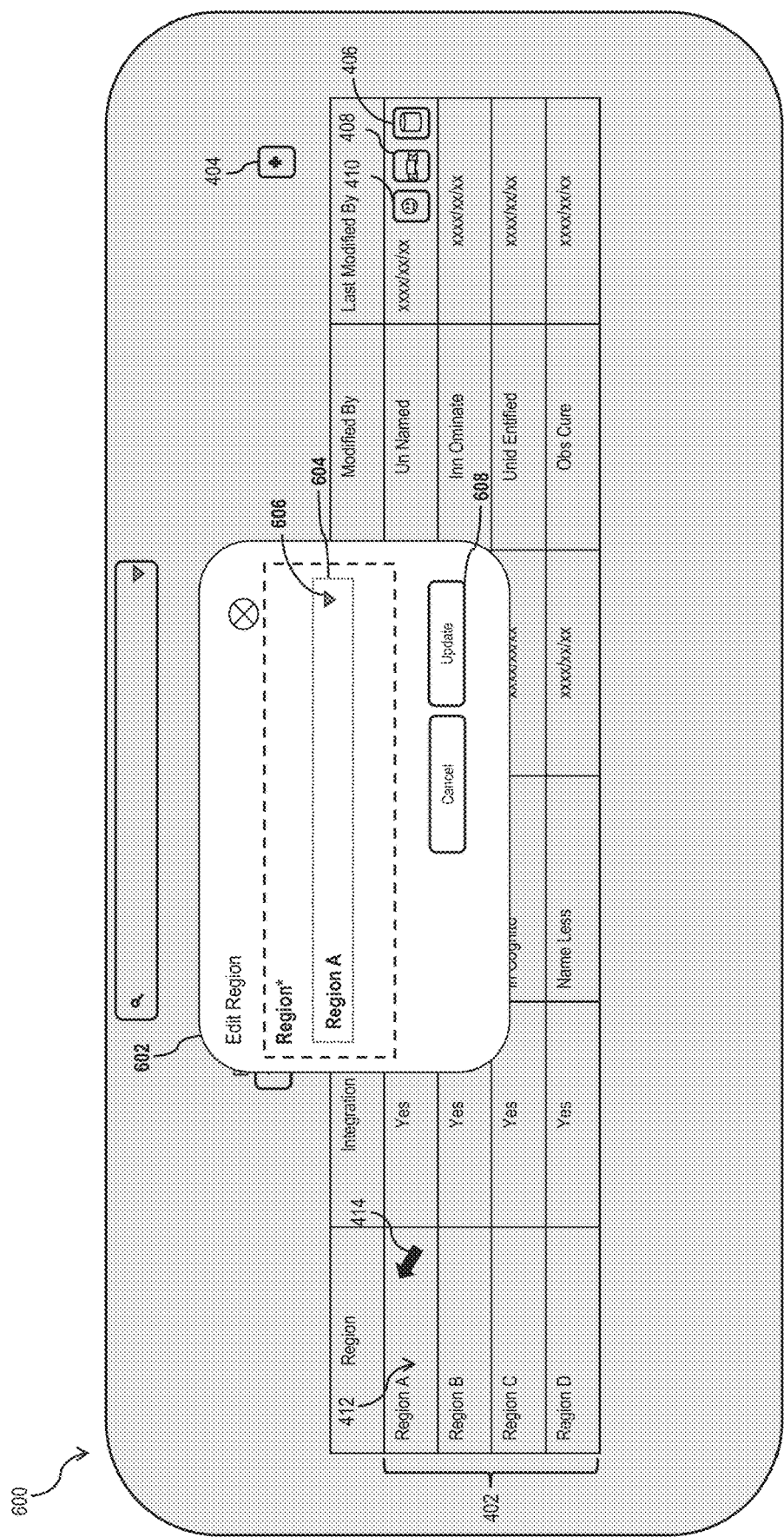
FIG. 6 depicts a region configuration system GUI, in accordance with some embodiments.

FIG. 6 depicts a region configuration system GUI 600, in accordance with some embodiments.

In operation 210 of method 200, the super admin is able to edit an existing RCP, such as RCP 412. In response to the super admin hovering over or clicking on RCP 412, super admin is able to click on edit button 408 ("YES" branch of block 210), where the selected RCP (e.g., Region A RCP in box 604) is displayed in pop-out box 602. In some embodiments, the super admin is able to type in the RCP in box 604 (which is able to be auto completed through AI) or the super admin is able to use down arrow 606 to select an RCP from list of RCPs 402. The super admin is then able to click on update button 608 to begin editing the selected RCP at operation 212. Process flows from operation 212 to operation 214.

Figure 7:
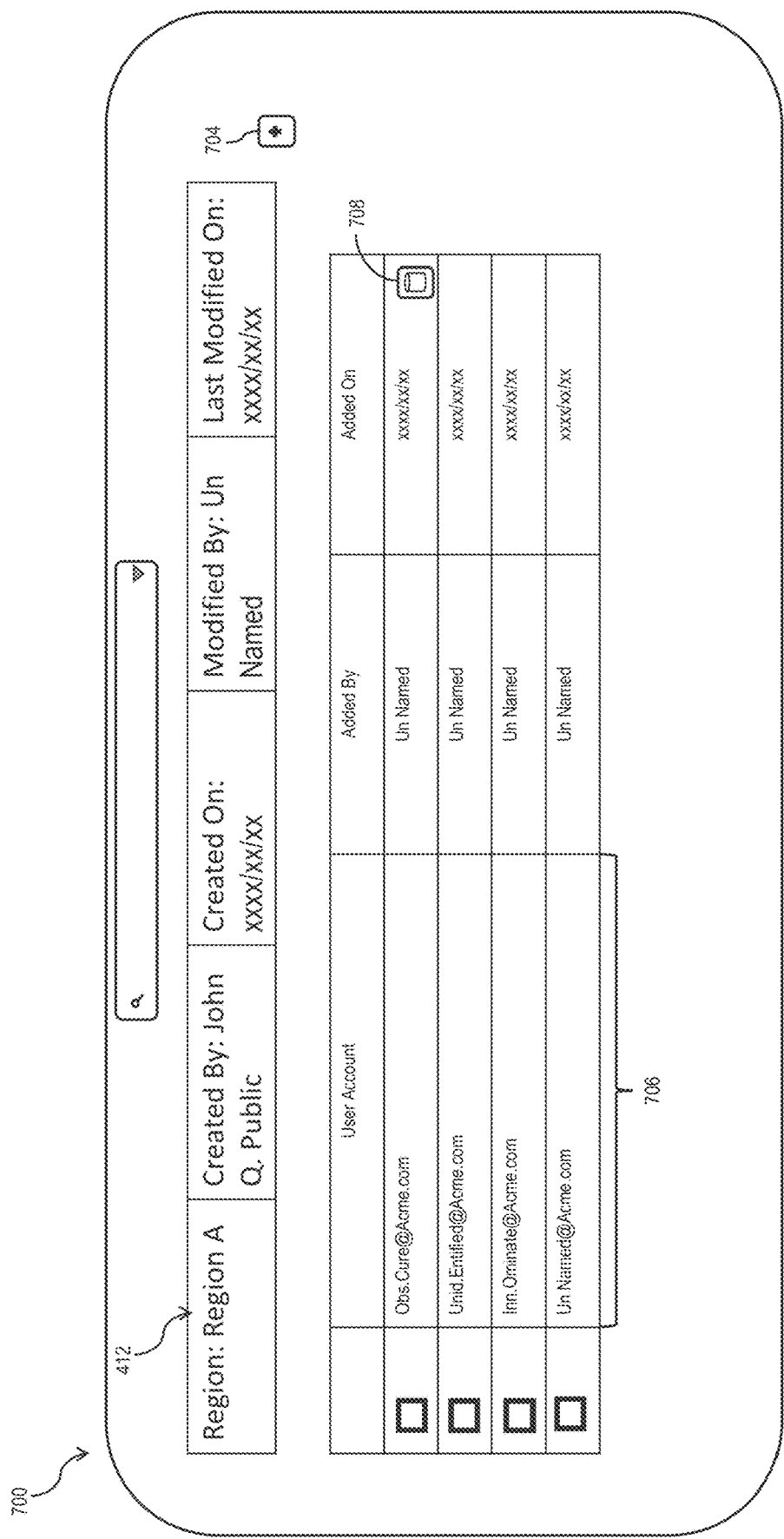
FIG. 7 depicts a region configuration system GUI, in accordance with some embodiments.

FIG. 7 depicts a region configuration system GUI 700, in accordance with some embodiments.

In operation 214 of method 200, a super admin is able to map a user or budget admin to an RCP, such as RCP 412. In operation 216 ("YES" branch of block 214), super admin is able to select an RCP, such as RCP 412, by clicking on the row RCP 412 is in. In operation 214 of method 200, a super user is able to map a user to an RCP. The super admin is able to add/map user(s), through add/map button 704, to an RCP, such as RCP 412. The super admin is also able to un-map a user using remove button 708. Process flows from operation 214 to operation 216.

Figure 8:
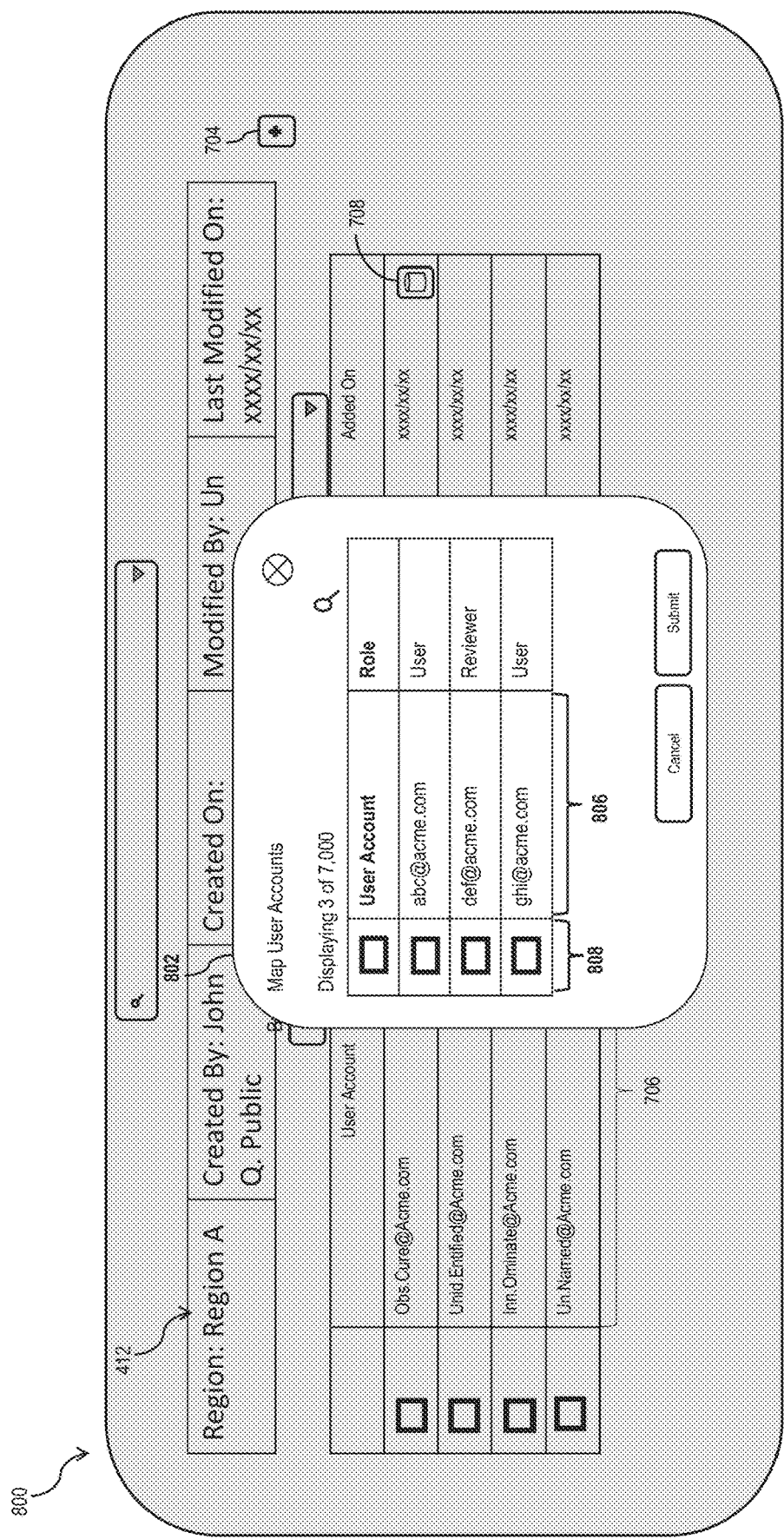
FIG. 8 depicts a region configuration system GUI, in accordance with some embodiments.

FIG. 8 depicts a region configuration system GUI 800, in accordance with some embodiments.

In operation 216 of method 200, a super admin is able to add or map a user to an RCP. In a non-limiting example, the super admin triggers an associated functional element (e.g., a "+" button 704), and RCS 130 collects information of available users 806 from memory 130(2), and GUI 800 generates and presents this information through pop-out window 802 to the super admin. Pop-out window 802 includes a list of available users 806 and a one or more user input fields 808 each of which is configured to allow the super admin to input or select a parameter (e.g., name of user from list of available users 806, select/deselect a user with window 808). After adding/mapping a user to an RCP, the added user has access to master data associated with a region specified by the RCP, such as RCP 412. Process flows from operation 216 to operation 218.

Figure 9:
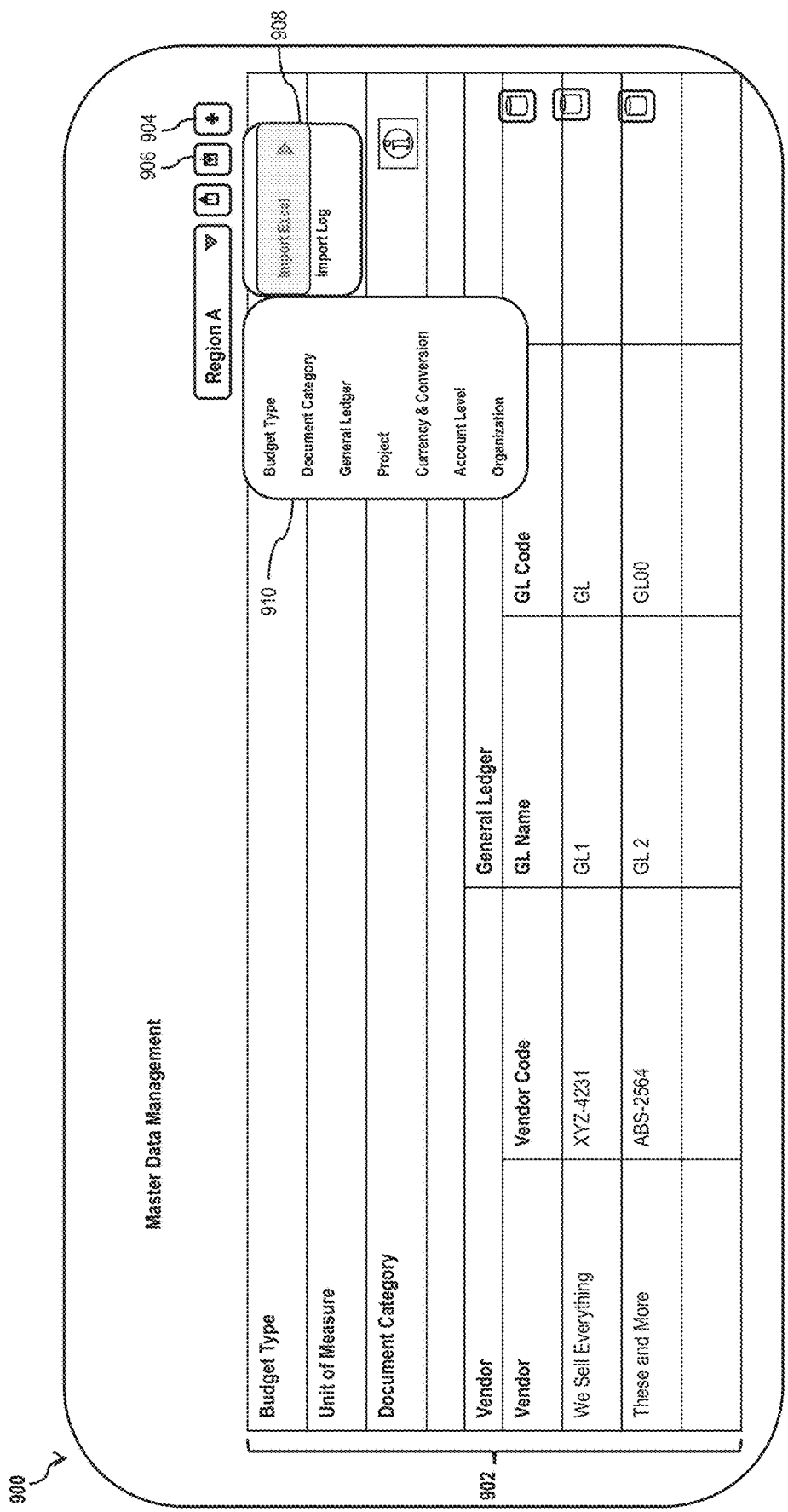
FIG. 9 depicts a master data management GUI, in accordance with some embodiments.
Figure 10:
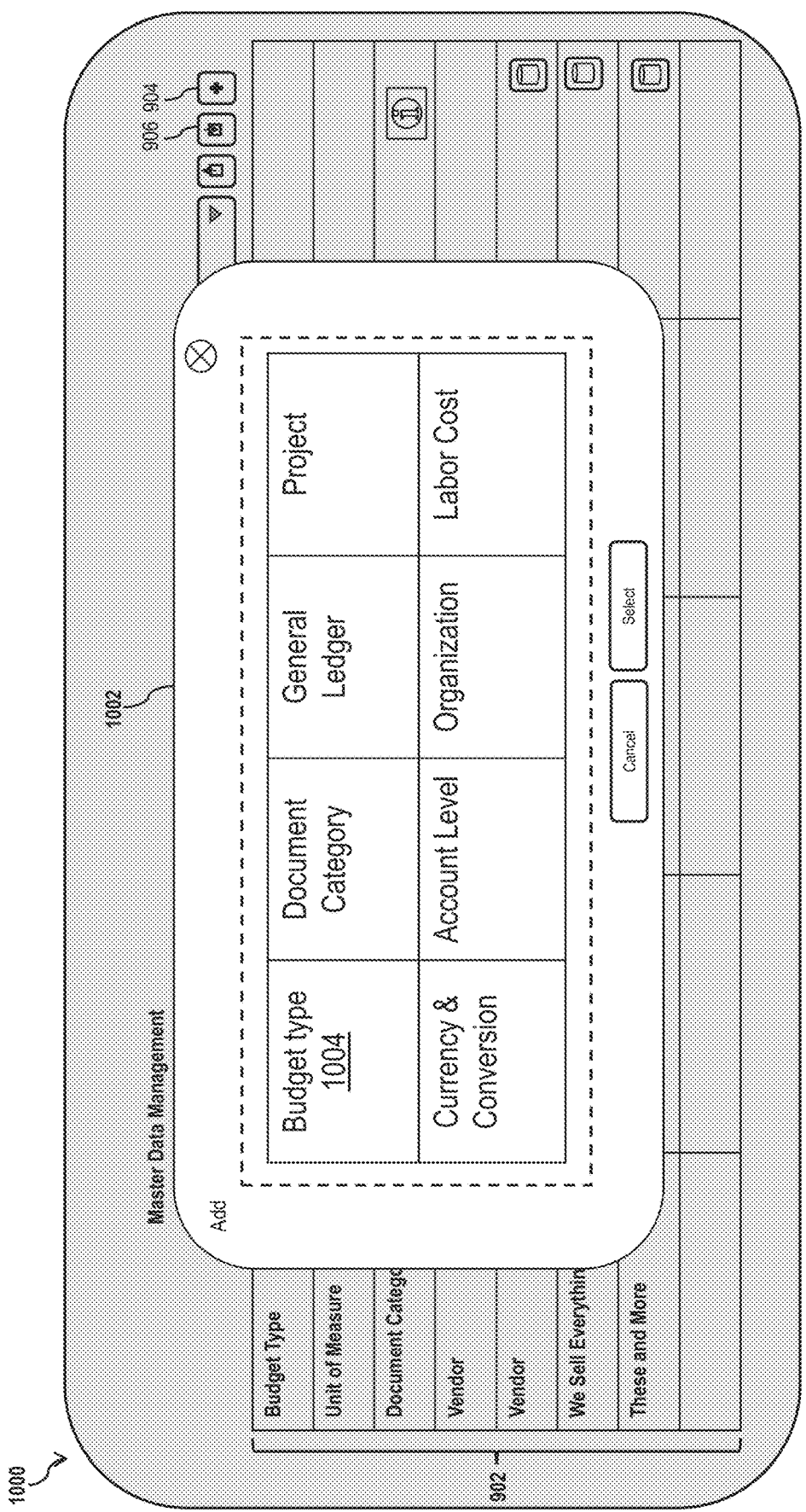
FIG. 10 depicts master data management GUI, in accordance with some embodiments.
Figure 11:
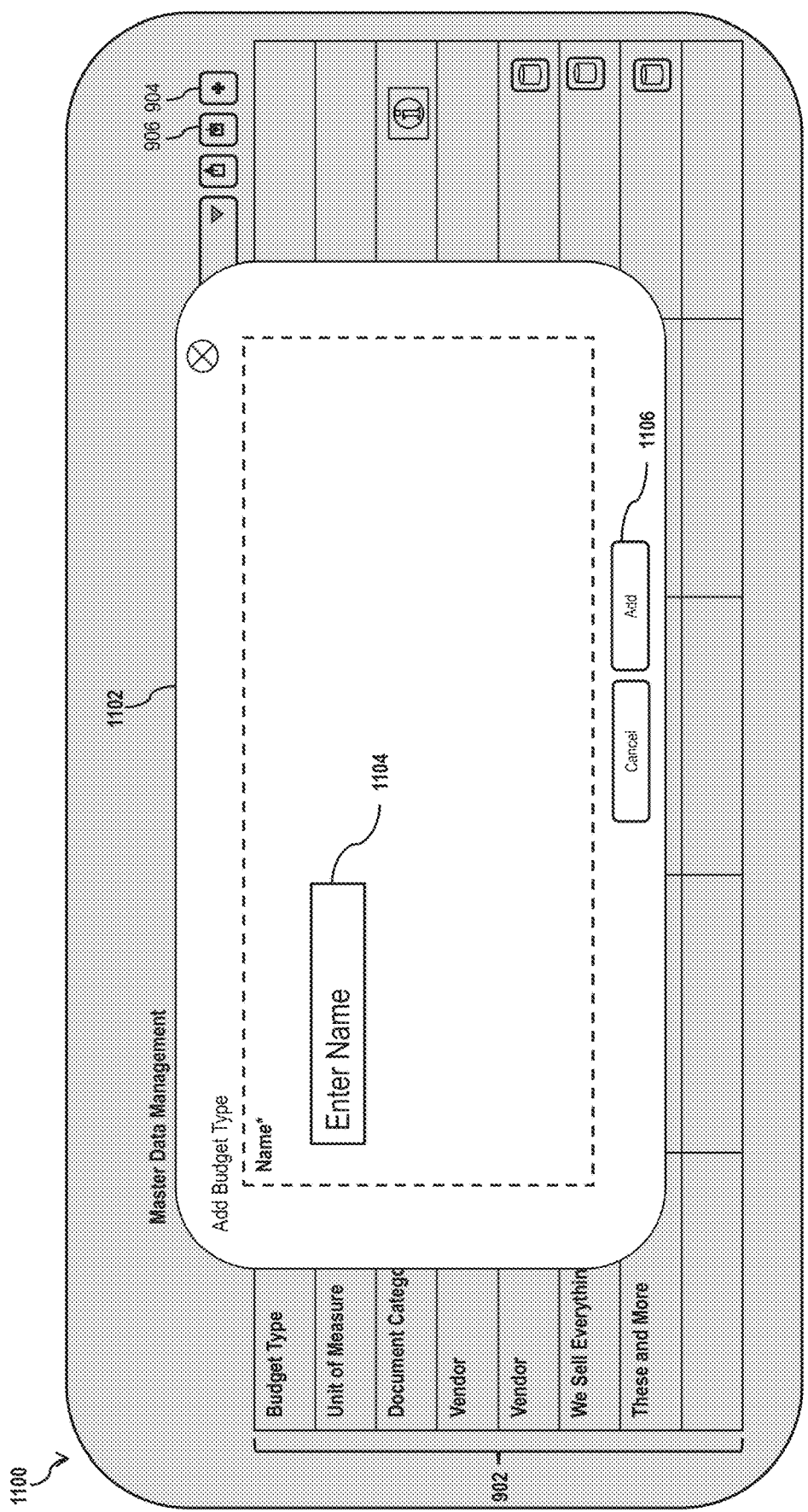
FIG. 11 depicts a master data management GUI, in accordance with some embodiments.
Figure 12:
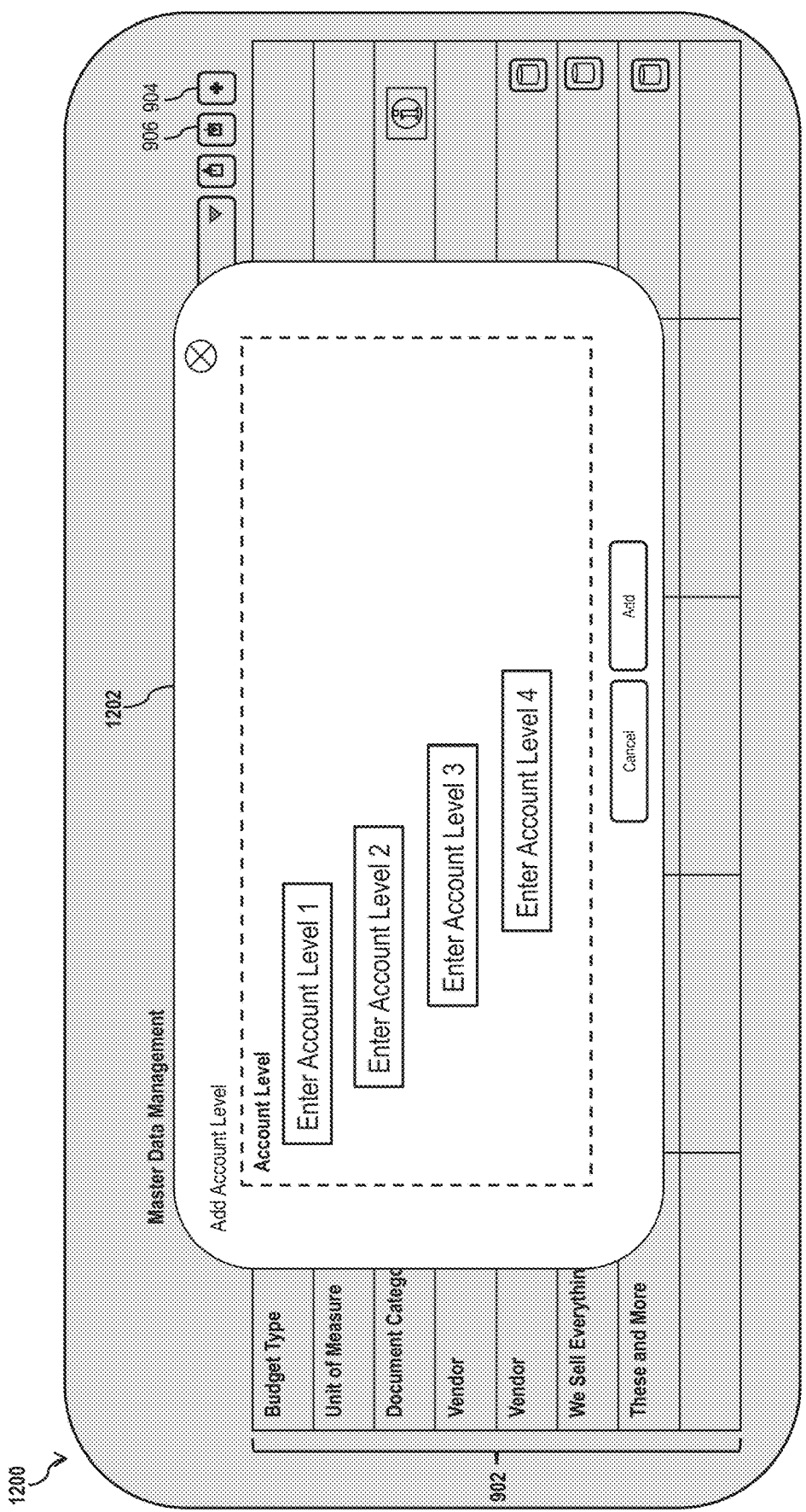
FIG. 12 depicts a master data management GUI, in accordance with some embodiments.

FIG. 9 depicts a master data management GUI 900, in accordance with some embodiments.

In operation 218, a budget admin creates master data, such as master data 121 for a new user. In a non-limiting example, once a budget admin is assigned with a respective RCP, the budget admin is able to create and manage master data for users that belong to the RCP assigned to the budget admin. In some embodiments, the process of region configuration creation and region mapping is able to be performed once, (e.g., when there is a new budget admin). In response to a budget admin changing from one region to another region, the super admin is able to edit an assigned RCP to update the respective information. In response to a budget admin leaving a position, the super admin is able to simply delete the budget admin from the assigned RCP with delete button 708 and the budget admin no longer has access to the master data of the assigned RCP. In some embodiments, the super admin creates a master data (e.g., on behalf of a budget admin) and edit/delete a master data created by a budget admin/other super admin.

In operation 218, a process for registration of new user includes a request to access to CBMS 120 from a user's terminal, such as UI 104. In some embodiments, CBMS 120 generates and presents a GUI, like GUI 300, to the user through the user's terminal, such as UI 104. A registered user is able to input requested information (e.g., user ID, password, fingerprint scanning, or other suitable verification measure within the contemplated scope of the disclosure) to log in to CBMS 120. In some embodiments, a new user is able to register information by inputting the requested information via a GUI (not shown). In some embodiments, CBMS 120 sends the information of the new user to MDMS 132.

In some embodiments, MDMS 132 receives information of new user from a memory 130(2). MDMS 132 generates a notification based on receiving of the user's information and sends the notification to a terminal, such as UI 104, of the budget admin, so that the budget admin is notified to create master data for the new user, which is performed from GUI 900.

Budget admin is able to log-in to MDMS 132 by inputting user information to a GUI, like GUI 300, presented by MDMS 132. Once MDMS 132 has verified that the budget admin inputted information complies with the master data information of a budget admin, the MDMS 132 generates and presents GUI 900 to the budget admin to allow the budget admin to create and manage (e.g., edit, delete, or other suitable modification of data within the contemplated scope of the disclosure) master data associated to the region assigned to the budget admin (which is stored in MDMS memory 132(2)). In some embodiments, in response to the MDMS 132 verifies that the user is an authorized user but not a budget admin, MDMS generates and presents another GUI (not shown) to the user, so that the user is still able to view, search and/or export the created master data but not able to create new master data or manage the created master data.

GUI 900 is configured to provide the budget admin a list of master data 902 available to be managed by the budget admin. The budget admin is able to manage (e.g., edit, delete, other modification measure within the contemplated scope of the disclosure) master data on list 902, the budge admin is able to select the master data (e.g., by clicking on the respective master data, by shortcut key, other suitable human interface device within the contemplated scope of the disclosure) and MDMS 132 retrieves the information associated with the selected master data from master data 121. As shown below, MDMS 132 generates a new GUI (on-top of GUI 900), presenting to the budget admin user input fields containing information of the selected master data, where the budget admin is able to edit the information directly into the user input fields.

In a non-limiting example, a budget admin is able to create master data for a new user based on the information provided by memory 130(2). GUI 900 is configured to provide one or more options for the budget admin to create new master data. The master data is able to be added by clicking on addition user input button 904 and directly inputting the user's information through user input fields of additional pop-out GUIs, or by clicking on upload user input button 906 and uploading a document (e.g., excel, csv, or other suitable files within the contemplated scope of the disclosure) containing the new user's information. Process flows from operation 218 to operation 220.

FIGS. 10-14 depicts master data management GUI, in accordance with some embodiments.

In operation 220 of method 200, a budget admin is able to select whether to input master data manually or upload the master data from a pre-created file. In response to a budget admin selecting to input the master data manually ("MANUAL" branch of block 220), GUI 1000 is presented to the budget admin with pop-out box 1002

After the master data of the user is created, the master data is stored in memory 132(2). In response to a user accessing the CBMS 120 (operation 226), CBMS 120 accesses MDMS 132 of CMDMS 100 and retrieves master data 121 associated with the user. In response to a user accessing CBMS 120, master data associated to the user is retrieved (e.g., before the user creates a budget application). In some embodiments, the user creates a budget application available based on master data 121 (e.g., in response to the user being in region A, the user creates a budget application associated to region A, or the like.)

In a non-limiting example, a budget admin selects budget type block 1004 and GUI 1100 (FIG. 11) is presented through a UI, such as UI 104. In some embodiments, a budget admin is able to enter a budget name within user input field 1104 of pop-out box 1102. In some embodiments, the budget admin enters the data and clicks on user input button 1106 for the data to be reflected in a budget creation page.

Continuing with the example, a budget admin is able to maintain account level data in GUI 1200 (FIG. 12) through pop-up box 1202 where an account hierarchical order is created. In some embodiments, a budget admin adds one parameter for a parent field and multiple parameters for dependent fields. In some embodiments, pop-up box 1202 includes interactive elements (e.g., add button, delete button, etc.) to allow the budget admin to add and to delete an account level.

Figure 13:
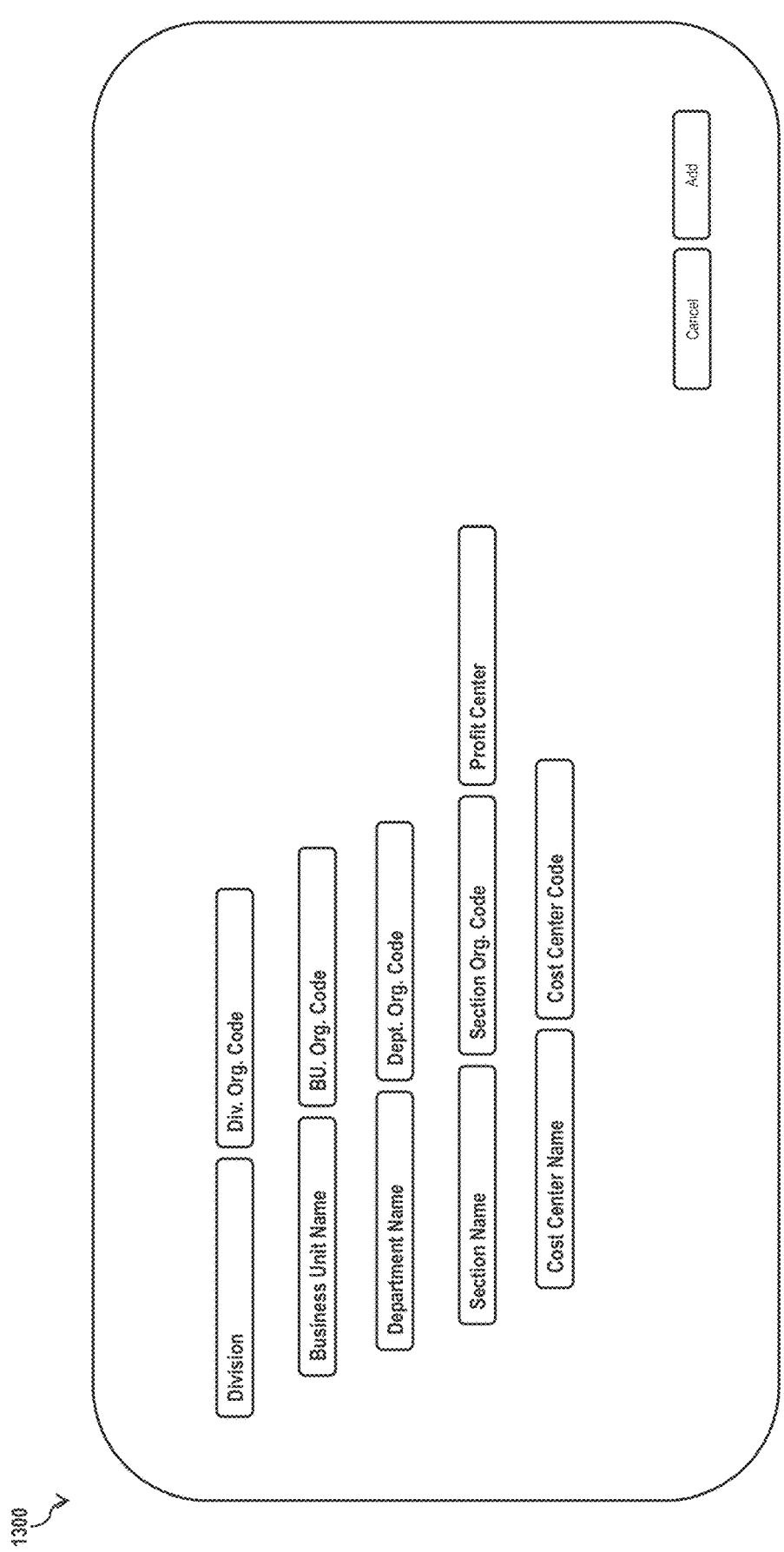
FIG. 13 depicts a master data management GUI, in accordance with some embodiments.

Continuing with the example, a budget admin is able to maintain organizational data in a hierarchical order in a parent-child relationship in GUI 1300 (FIG. 13). A budget admin is able to add one value for a parent field (e.g., business unit) and multiple values for child fields (e.g., department, section, and cost center fields) for an organization. In some embodiments, GUI 1300 includes interactive elements (e.g., add button, delete button, etc.) to allow the budget admin to add and to delete a business unit, a department, a section, and a cost center.

In operation 224 of method 200 ("UPLOAD" branch of block 220), a budget admin is able to import master data through a file import. With reference again to FIG. 9 and GUI 900, budget admin is able to perform file import by clicking on user input button 906. User input button 906 pulls up pop-out box 908 that allows a budget admin to choose the type of file he wants to import (e.g., in the embodiment exemplified in FIG. 9, the available type of file is an Excel file). In response to a budget admin selecting Excel, the budget admin is able to select what type of data is being imported in pop-out box 910. In some embodiments, a budget admin is able to hover above the option in pop-out box 908 to see options within pop-out box 910, where the budget admin is able to then select a data name from the list to import.

Figure 14:
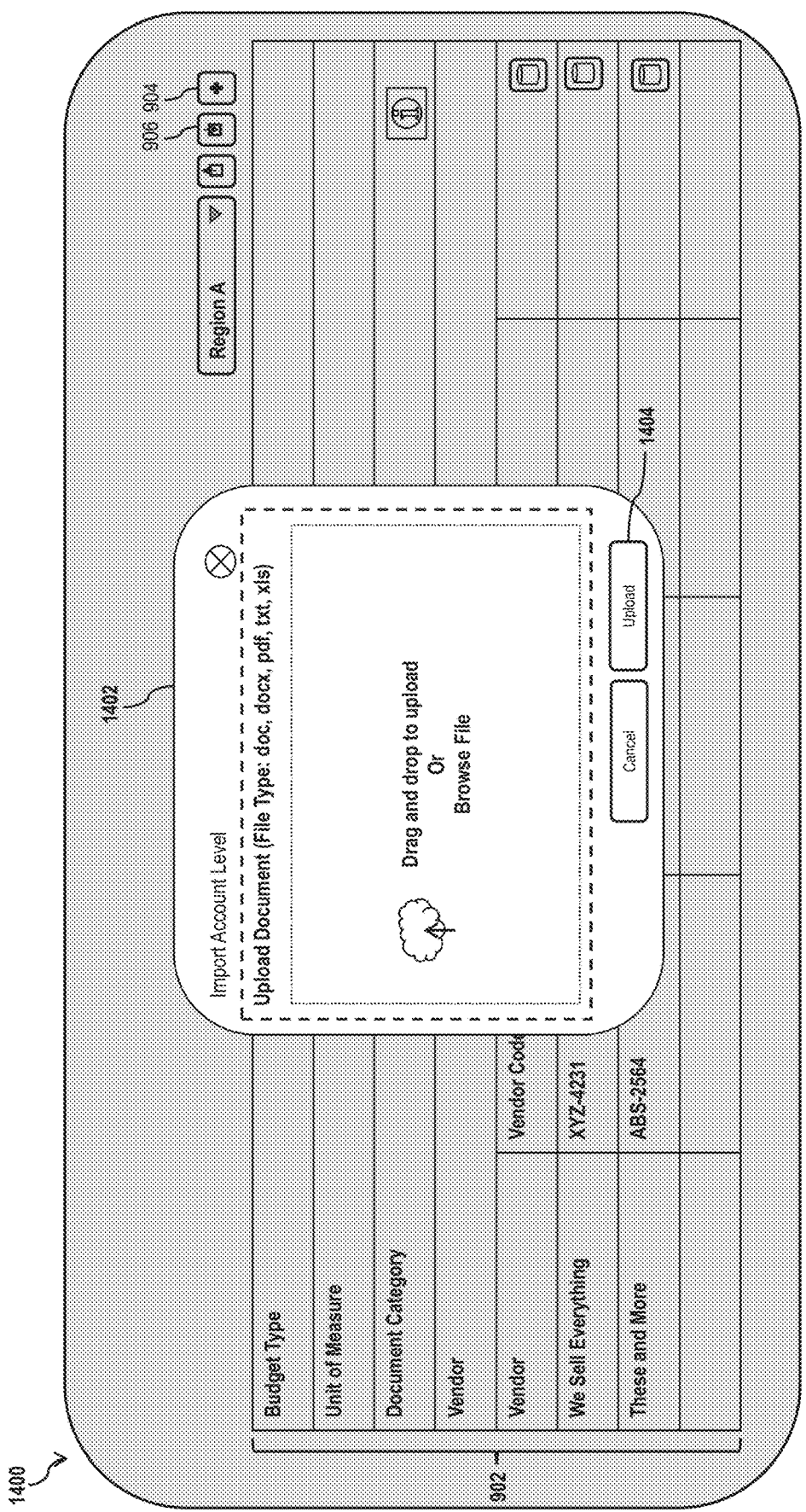
FIG. 14 depicts a master data management GUI, in accordance with some embodiments.

With reference to FIG. 14, GUI 1400 displays a pop-out box 1402 that allows a budget admin to upload a file containing master data 121 to be uploaded to MDMS 132. Once selected or dragged and dropped the file, the budget admin would click upon user input button 1404 to complete the upload. The details of the upload process (e.g., successful, failed, pending, etc.) are recorded in a log file, wherein the log file is accessible by a user (e.g., by selecting an associated option in pop-out box 908, etc.). In some embodiments, the log file comprises information such as: status of the upload (e.g., successful, failed, etc.), title/name of the file, the type of the file (e.g., account level, currency, etc.), the information of the user who is uploading the file, the date and time the user initiates the upload process, and any other suitable information which can allow a user to check the details of the upload process (e.g., reason of upload failure, etc.)

In some embodiments, after a master data is created/added, the master data is accessible by a user of the CMDMS, and the user performs an action to the master data accordingly. For instance, a budget originator/creator searches, views, and exports the associated master data (e.g., master data associated to a region assigned to the budget originator/creator). Further, a budget admin searches, views, edits (e.g., modify, delete, etc.), and exports the associated master data (e.g., master data associated to a region assigned to the budget admin). Furthermore, a super admin searches, views, edits (e.g., modify, delete, etc.), and exports any master data stored in the memory 132(2).

In some embodiments, a master data management system (MDMS) includes a memory having non-transitory instructions stored therein; and processing circuitry coupled to the memory, and being configured to execute the instructions, thereby causing the processing circuitry to cause a graphical user interface (GUI) to be output by a user interface (UI), the GUI includes a first user input field configured to receive a first user input identifying an administrator to log in to the MDMS; in response to a successful log in to the MDMS, obtain master data from the memory, the master data being associated with the administrator; update the GUI to be output by the UI, the GUI includes a list of region configuration profiles (RCPs) managed by the administrator; and one or more functional elements, wherein each functional element trigger a respective action in response to being selected by the administrator; and authorize a user, within a predefined region, to be able to create and submit budget applications.

In some embodiments, the instructions further cause the processing circuitry to select an RCP from the list of RCPs based on a trigger of the one or more functional elements.

In some embodiments, the instructions further cause the processing circuitry to edit the RCP presented on the list of RCPs.

In some embodiments, the instructions further cause the processing circuitry to update the GUI to be output by the UI, the GUI includes a pop-out window that displays a user's request to be associated with a region.

In some embodiments, the instructions further cause the processing circuitry to create an RCP based on user parameters selected by the administrator from the user's request.

In some embodiments, the instructions further cause the processing circuitry to generate an updated list of RCPs such that the created RCP is included and shown in the updated list of RCPs, in response to the created RCP.

In some embodiments, the creation of the RCP based on the user parameters selected by the administrator from the user's request further includes in response to the administrator triggering an associated functional element, receive user information from data storage.

In some embodiments, the instructions further cause the processing circuitry to map a user to the region based on the created RCP.

In some embodiments, the instructions further cause the processing circuitry to restrict a user's access to master data based on the created RCP.

In some embodiments, a method executed by a processing circuitry includes causing a graphical user interface (GUI) to be output by a user interface (UI), the GUI includes a first user input field configured to receive a first user input identifying an administrator to log in to a centralized master data management system (CMDMS); in response to a successful log in to the CMDMS, obtaining master data from a memory, the master data being associated with the administrator; updating the GUI to be output by the UI, the GUI includes a list of region configuration profiles (RCPs) managed by the administrator; and one or more functional elements, wherein each functional element trigger a respective action in response to being selected by the administrator; and authorizing a user, within a predefined region, to be able to create and submit budget applications.

In some embodiments, the method further includes selecting an RCP from the list of RCPs based on a trigger of the one or more functional elements.

In some embodiments, the method further includes editing the RCP presented on the list of RCPs.

In some embodiments, the method further includes updating the GUI to be output by the UI, the GUI including a pop-out window that displays a user's request to be associated with a region.

In some embodiments, the method further includes creating an RCP based on user parameters selected by the administrator from the user's request.

In some embodiments, the method further includes generating an updated list of RCPs such that the created RCP is included and shown in the updated list of RCPs, in response to the created RCP.

In some embodiments, a non-transitory computer readable medium including instructions executable by a controller of a user equipment to cause the controller to perform operations comprising:
  causing a graphical user interface (GUI) to be output by a user interface (UI), the GUI includes a first user input field configured to receive a first user input identifying an administrator to log in to a centralized master data management system (CMDMS); in response to a successful log in to the CMDMS, obtaining master data from a memory, the master data being associated with the administrator; updating the GUI to be output by the UI, the GUI includes a list of region configuration profiles (RCPs) managed by the administrator; and one or more functional elements, wherein each functional element trigger a respective action in response to being selected by the administrator; and authorizing a user, within a predefined region, to be able to create and submit budget applications.

In some embodiments, the instructions further cause the controller to perform operations that include selecting an RCP from the list of RCPs based on a trigger of the one or more functional elements.

In some embodiments, the instructions further cause the controller to perform operations that include edit the RCP presented on the list of RCPs.

In some embodiments, the instructions further cause the controller to perform operations that include updating the GUI to be output by the UI, the GUI includes a pop-out window that displays a user's request to be associated with a region.

In some embodiments, the instructions further cause the controller to perform operations that include creating an RCP based on user parameters selected by the administrator from the user's request.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should further realize that such equivalent constructions do not depart from the spirit and scope of the present disclosure, and that they may make various changes, substitutions, and alterations herein without departing from the spirit and scope of the present disclosure.

What is claimed is:

1. A centralized master data management system (CMDMS), comprising:
a memory having non-transitory instructions stored therein; and
processing circuitry coupled to the memory, and being configured to execute the instructions, thereby causing the processing circuitry to:
cause a graphical user interface (GUI) to be output by a user interface (UI), the GUI comprising:
a first user input field configured to receive a first user input identifying an administrator of an organization to log in to the CMDMS;
in response to a successful log in to the CMDMS, obtain master data from the memory, the master data being associated with the administrator;
update the GUI to be output by the UI, the GUI comprising:
a list of region configuration profiles (RCPs) managed by the administrator, each RCP of the list of RCPs specifying a predefined region of the organization; and
one or more functional elements, wherein each functional element is configured to trigger a respective action in response to being selected by the administrator; and
authorize a user, within a predefined region of the predefined regions of the organization, to be able to create and submit budget applications.

2. The CMDMS system of claim 1, wherein the instructions further cause the processing circuitry to:
select an RCP from the list of RCPs based on a trigger of the one or more functional elements.

3. The CMDMS system of claim 2, wherein the instructions further cause the processing circuitry to:
edit the RCP presented on the list of RCPs.

4. The CMDMS system of claim 1, wherein the instructions further cause the processing circuitry to:
update the GUI to be output by the UI, the GUI comprising:
a pop-out window that displays a user's request to be associated with a region.

5. The CMDMS system of claim 4, wherein the instructions further cause the processing circuitry to:
create an RCP based on user parameters selected by the administrator from the user's request.

6. The CMDMS system of claim 5, wherein the instructions further cause the processing circuitry to:
generate an updated list of RCPs such that the created RCP is included and shown in the updated list of RCPs, in response to the created RCP.

7. The CMDMS system of claim 5, wherein the creation of the RCP based on the user parameters selected by the administrator from the user's request further includes:
in response to the administrator triggering an associated functional element, receive user information from data storage.

8. The CMDMS system of claim 7, wherein the instructions further cause the processing circuitry to:
map a user to the region based on the created RCP.

9. The CMDMS system of claim 8, wherein the instructions further cause the processing circuitry to:
restrict a user's access to master data based on the created RCP.

10. A method executed by a processing circuitry, the method comprising:
causing a graphical user interface (GUI) to be output by a user interface (UI), the GUI comprising:
a first user input field configured to receive a first user input identifying an administrator of an organization to log in to a centralized master data management system (CMDMS);
in response to a successful log in to the CMDMS, obtaining master data from a memory, the master data being associated with the administrator;
updating the GUI to be output by the UI, the GUI comprising:
a list of region configuration profiles (RCPs) managed by the administrator, each RCP of the list of RCPs specifying a predefined region of the organization; and
one or more functional elements, wherein each functional element is configured to trigger a respective action in response to being selected by the administrator; and
authorizing a user, within a predefined region of the predefined regions of the organization, to be able to create and submit budget applications.

11. The method of claim 10, further comprising:
selecting an RCP from the list of RCPs based on a trigger of the one or more functional elements.

12. The method of claim 11, further comprising:
editing the RCP presented on the list of RCPs.

13. The method of claim 10, further comprising:
updating the GUI to be output by the UI, the GUI comprising:
a pop-out window that displays a user's request to be associated with a region.

14. The method of claim 13, further comprising:
creating an RCP based on user parameters selected by the administrator from the user's request.

15. The method of claim14, further comprising:
generating an updated list of RCPs such that the created RCP is included and shown in the updated list of RCPs, in response to the created RCP.

16. A non-transitory computer readable medium including instructions executable by a controller of a user equipment to cause the controller to perform operations comprising:
causing a graphical user interface (GUI) to be output by a user interface (UI), the GUI comprising:

a first user input field configured to receive a first user input identifying an administrator of an organization to log in to a centralized master data management system (CMDMS);

in response to a successful log in to the CMDMS, obtaining master data from a memory, the master data being associated with the administrator;

updating the GUI to be output by the UI, the GUI comprising:
- a list of region configuration profiles (RCPs) managed by the administrator, each RCP of the list of RCPs specifying a predefined region of the organization; and
- one or more functional elements, wherein each functional element is configured to trigger a respective action in response to being selected by the administrator; and authorizing a user, within a predefined region of the predefined regions of the organization, to be able to create and submit budget applications.

17. The non-transitory computer readable medium of claim 16, wherein the instructions further cause the controller to perform operations that include:
selecting an RCP from the list of RCPs based on a trigger of the one or more functional elements.

18. The non-transitory computer readable medium of claim 17, wherein the instructions further cause the controller to perform operations that include:
edit the RCP presented on the list of RCPs.

19. The non-transitory computer readable medium of claim 16, wherein the instructions further cause the controller to perform operations that include:
updating the GUI to be output by the UI, the GUI comprising:
a pop-out window that displays a user's request to be associated with a region.

20. The non-transitory computer readable medium of claim 19, wherein the instructions further cause the controller to perform operations that include:
creating an RCP based on user parameters selected by the administrator from the user's request.

* * * * *